United States Patent [19]

Kutsi

[11] 4,165,598
[45] Aug. 28, 1979

[54] SELF-CLEANING RAKE

[76] Inventor: Ero A. Kutsi, 306 S. 60th Ave. W., Duluth, Minn. 55807

[21] Appl. No.: 838,309

[22] Filed: Sep. 30, 1977

[51] Int. Cl.² ........................................... A01D 7/10
[52] U.S. Cl. ................................................. 56/400.1
[58] Field of Search .............. 56/400.08, 400.09, 400.1

[56] References Cited

U.S. PATENT DOCUMENTS

| | | | |
|---|---|---|---|
| 588,330 | 8/1897 | Green | 56/400.1 |
| 886,164 | 4/1908 | Tait | 56/400.1 |
| 972,031 | 10/1910 | Spalding et al. | 56/400.09 |
| 1,144,703 | 6/1915 | Goodsell | 56/400.1 |
| 1,254,041 | 1/1918 | Hoel | 56/400.08 |
| 1,826,793 | 10/1931 | Klingler | 56/400.08 |
| 1,958,757 | 5/1934 | Klingler | 56/400.08 |

*Primary Examiner*—Russell R. Kinsey
*Attorney, Agent, or Firm*—Wicks & Nemer

[57] ABSTRACT

A self-cleaning rake including an elongated handle having a rake head frame with spaced tines rigidly secured to one end of the handle. A plate is pivotally mounted on the handle for pivotal movement relative to the rake head frame and tines. The plate is formed with a multiplicity of spaced holes through which the tines extend as the plate is pivotally moved to and from the rake head. The plate has secured thereto a check bolt which has a first lug thereon for contact with the frame to limit the pivotal movement of the plate beyond the face ends of the tines and a second lug pivotally mounted on the check bolt for releasable engagement with the frame to selectively hold the plate in close proximity to said rake head frame to allow use of said tines independent of said plate.

2 Claims, 3 Drawing Figures

SELF-CLEANING RAKE

SUMMARY

The invention relates broadly to hand rakes having tines for rakeing leaves, grass and other debris on the ground and more particularly to a hand rake which when debris is collected on the tines of the rake frame the debris is removed from the tines by simply lifting the rake upwardly. The self-cleaning feature of the invention is accomplished by pivotally mounting a weighted plate on the end of the rake handle beneath the frame, the plate having holes through which the tines of the rake extend.

A check bolt is secured to the plate and has formed thereon a first lug which engages the rake frame to limit the movement of the plate beyond the free ends of the tines. As debris is raked by means of the tines maintained in contact with the ground and debris gathers beneath the plate and back of the tines, and the plate is forced pivotally upwardly. When sufficient debris has been gathered under the plate and adjacent the tines, the debris is removed from the tines and under the plate by simply lifting the rake from the ground whereby the weighted plate pivotally drops the forces the debris off the tines.

The tines of the rake may be used conventionally and independently of the plate by means of a further lug releasably engageable with the rake frame to thereby hold the plate in close proximity to the rake frame.

It is a further feature to provide a plate as described above which prevents the debris from spilling over the frame of the rake as is done with conventional rakes.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1:
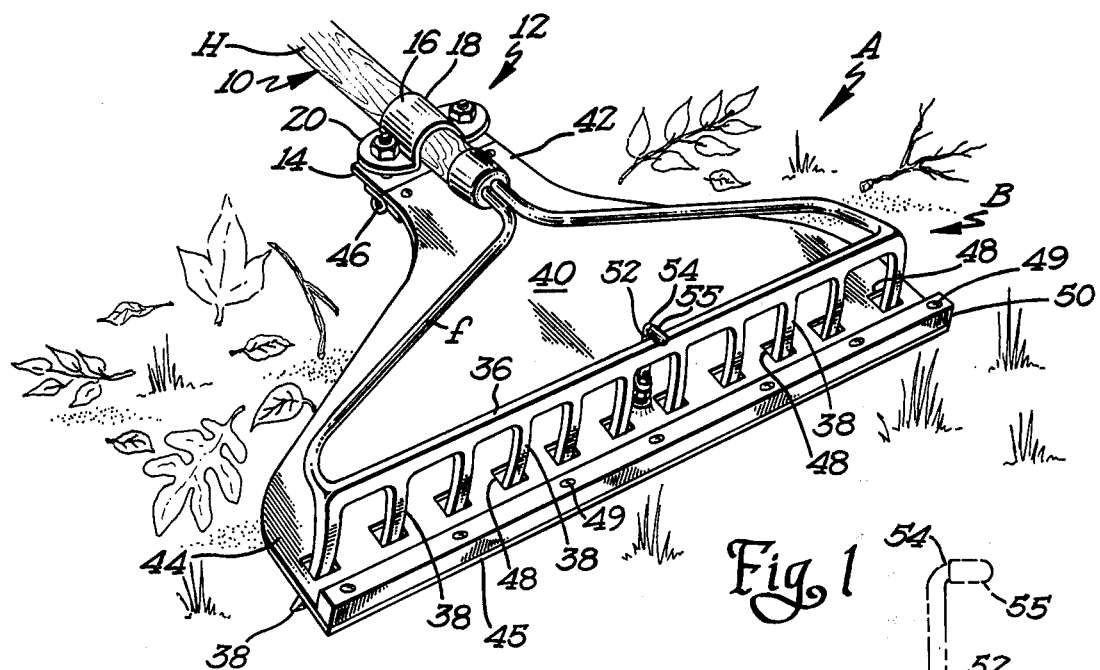
FIG. 1 is a perspective view of a self-cleaning hand make embodying the invention with the plate shown in pivotally raised leaf-gathering position in broken lines.

Referring to the drawings in detail, the self-cleaning rake A includes the handle 10 and mounted on one end of the handle is the clamp 12. The clamp 12 includes the clamp plate 14 and the clamp portion 16 formed of the arcuate portion 18 from which extends the ears 20 and 22. Each of the ears 20 and 22 is formed with a hole 24 and 26, respectively, and the clamp plate is formed with holes 28 and 30 aligned with holes 24 and 26 which receive nut-equipped bolts 32 and 34, respectively, whereby the clamp is secured against displacement at the end of the handle H.

Secured to the outer end of the handle H is the conventional bow rake head B which has the frame f including the cross bar 36 from which extends the spaced tines 38. The numeral 40 designates a pivotal leaf displacement plate having the narrowed rear portion 42 which broadens into the main forward portion 44 having the forward straight edge 45. The plate 40 is hingedly connected to the clamp plate 14 by means of the hinge 46 connected to the clamp plate 14 and the rear portion 42 of the leaf displacement plate 40.

Formed adgacent the forward edge 45 of the plate of the plate 40 are a multiplicity of spaced holes 48 through which the tines 38 freely extend as the plate 40 is pivoted to and from the frame f. Secured to the forward edge of the plate 40 by means of the rivets 49 is the weight bar 50.

The numeral 52 designates a check bolt which is secured at the lower end to the plate 40 substantially centrally of the forward portion and spaced from the edge 45. Secured to and extending from the check bolt 52 is the fixed stop lug 54 which extends forwardly and engages the rake cross bar 36 thereby limiting the pivotal downward movement of the plate 40.

The check bolt 52 also has mounted thereon the pivotal lug 56 which has a hole formed therethrough and through which the check bolt extends. The bolt 52 is threaded at its lower end portion as at "X", and nuts 58 and 60 are threadedly positioned on each side of the lug 56 so that the lug 56 can be pivoted from the position of FIG. 2 to that of FIG. 3 and locked into position by drawing up on one of the 58 or 60.

OPERATION

Figure 2:
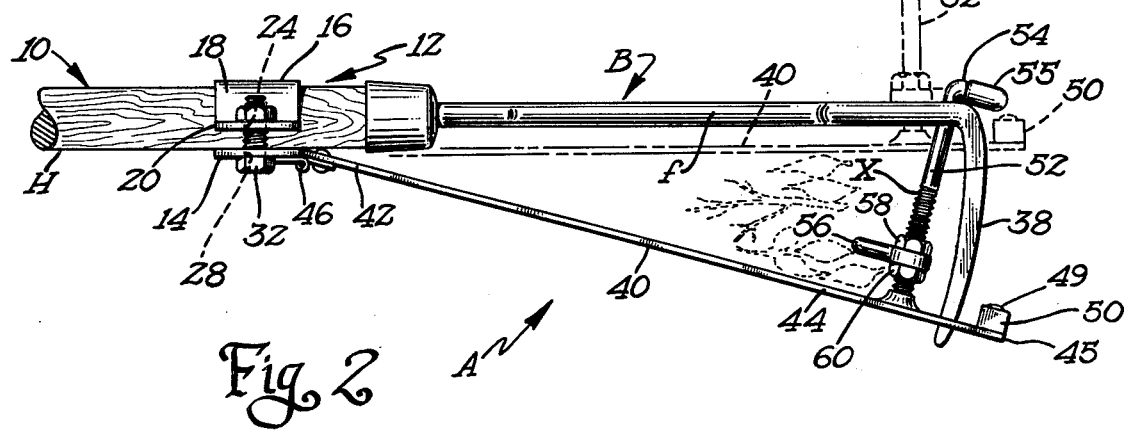
FIG. 2 is a side view thereof with the leaf displacement plate shown in an upward position in broken lines.

In using the self-cleaning rake A the lug 56 of check bolt 52 is rotated and secured in the position of FIG. 2 whereby the plate 40 is in the position as in FIG. 2. The rake A is then drawn across the ground and not lifted, and the tines 34 catch cut and loose grass and leaves behind the tines and under the plate. As the raked grass collects and bunches under the plate and back of the tines, the plate is caused to pivotally rise towards the frame f. When a sufficient amount of grass and/or leaves is raked, the rake is lifted from the ground and the plate pivotally drops thereby forcing leaves and/or grass from the tines 38 and back of the same.

Figure 3:
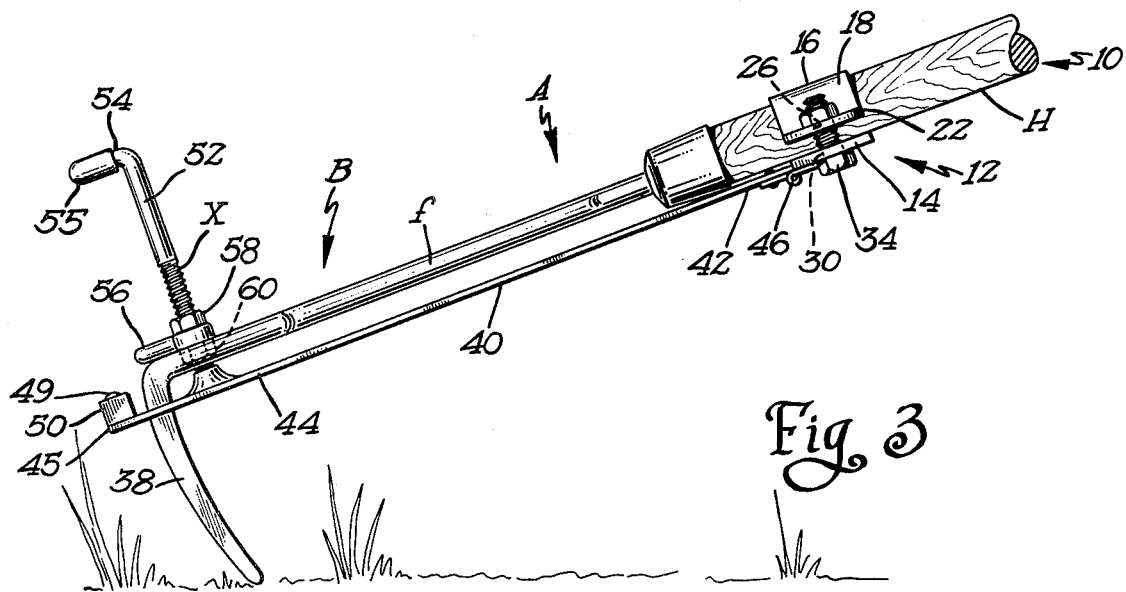
FIG. 3 is a side view showing the self-cleaning feature in a withdrawn position.

The rake tines may be used in a conventional way by moving the plate 40 upwardly and rotating and securing the lug 56 in the position of FIG. 3 so that it engages the top of bar 36 thereby holding the plate upwardly and closely adjacent the frame f, FIG. 3, so that substantially the full tines may be used without the plate 40.

Having thus described the invention, what is claimed as new and desired to be secured by Letters Patent is:

1. A self-cleaning rake comprising:
   (a) a rake head including a frame having a multiplicity of spaced tines extended substantially normal thereto and rigidly secured to one end of said handle,
   (b) a plate,
   (c) means pivotally mounting said plate on said handle for pivotal movement relative to said rake head and tines,
   (d) said plate formed with a multiplicity of holes through which said tines freely extend as said plate is pivotally moved to and from said rake head, and
   (e) means for limiting the pivotal movement of said plate beyond the free ends of said tines
   (f) the area of said plate being substantially that of the extent of said frame of said rake head,
   (g) said plate having weight means connected thereto to aid the downward pivotal movement of said plate for disengaging debris collected on said tines,
   (h) said means for limiting the pivotal movement of said plate including
   (i) a check bolt connected to said plate and having
   (j) a first lug for contact with said frame, (k) said means for limiting the pivotal movement of said plate including a second lug pivotally mounted on said check bolt for releasable engagement with said frame to selectively hold said plate in close proximity to said rake head frame to allow use of said tines independent of said plate.

2. A self-cleaning rake comprising:
(a) a rake head including a frame having a multiplicity of spaced tines extended substantially normal thereto and rigidly secured to one end of said handle,
(b) a plate,
(c) means pivotally mounting said plate on said handle for pivotal movement relative to said rake head and tines,
(d) said plate formed with a multiplicity of holes through which said tines freely extend as said plate is pivotally moved to and from said rake head, and
(e) means for limiting the pivotal movement of said plate beyond the free ends of said tines,
(f) the area of said plate being substantially that of the extent of said frame of said rake head,
(g) said means for limiting the pivotal movement of said plate including
(h) a check bolt connected to said plate and having
(i) a first lug for contact with said frame,
(j) said means for limiting the pivotal movement of said plate including a second lug pivotally mounted on said check bolt for releasable engagement with said frame to selectively hold said plate in close proximity to said rake head frame to allow use of said tines independent of said plate.

* * * * *